Oct. 2, 1956
R. D. WRIGHT
2,765,186
OIL SEAL
Filed June 3, 1953
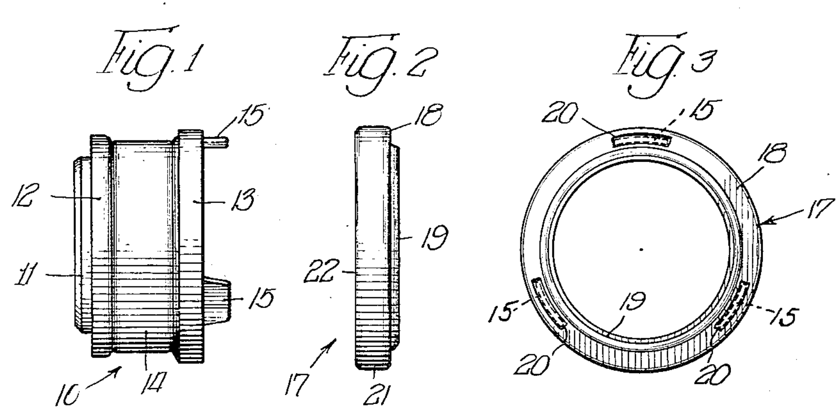
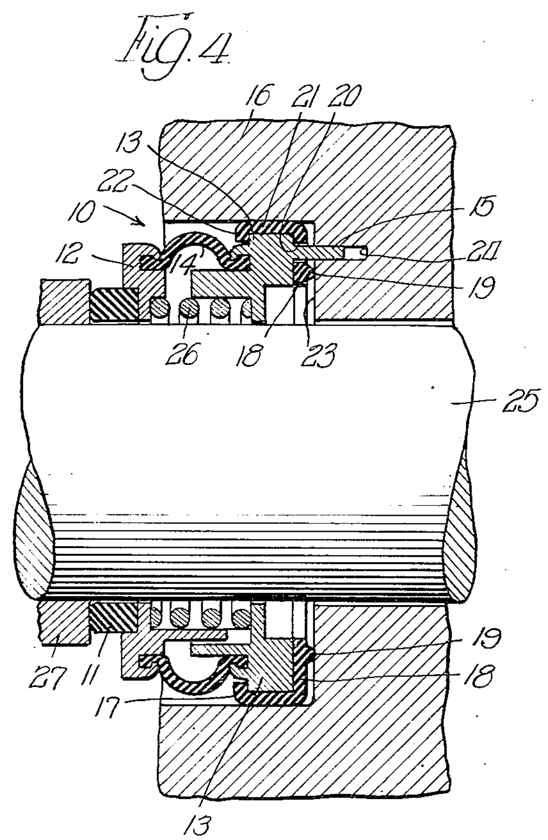
INVENTOR.
Robert D. Wright
BY
Cromwell, Greist + Warden
Attys 2,765,186
Patented Oct. 2, 1956

2,765,186

OIL SEAL

Robert D. Wright, Mount Prospect, Ill., assignor to Chicago Rawhide Manufacturing Company, Chicago, Ill., a corporation of Illinois Application June 3, 19‹3, Serial No. 359,299

5 Claims. (Cl. 288—2)

The present invention relates to improvements in an end face oil seal. Seals of this type are commonly employed to prevent escape of lubricant or entry of dirt or foreign matter in relation to a pair of coaxial, relatively rotatable parts, such as a housing and a shaft journalled therein.

It is a general object of the invention to provide an end face seal for such parts, including a mounting member or the like held in non-rotative relation to one of the sealed parts and an improved gasketing ring applied to the member and sealing the same in reference to the part in question, the gasketing ring having an improved construction which enables the same to be readily applied to the mounting member for assembly of the latter to the sealed part, also to resist undesired displacement therefrom prior to or during such assembly, eliminating the need to resort to cementing or other provisions to this end.

Another object is to provide an improved gasket or gasketing ring of the above sort which features an axial holding sleeve portion and a radial wall integral therewith which has provisions to accommodate certain locking tongues or elements on the mounting member, by which the latter is held in nonrotative relation to its associated sealed part.

More specifically, the invention provides an improved gasket ring, and a seal arrangement to which is applied, in which the gasket ring is in the form of a thin annulus of flexible or elastic, rubber-like material having an axially extending, bandlike sleeve portion to encase an outer peripheral surface of a seal mounting member, preferably with a relatively loose fit for ease of application, a small, radially inturned forward retaining lip or bead integral with the sleeve portion, and an integral radial rear wall on which an annular sealing rib may be formed to localize sealing action against the part to which the seal is applied, the retaining lip and sleeve portion serving to hold the gasket in place prior to assembly of the seal without the use of cement or other securing means.

A further object of the invention is to provide sealing provisions as defined in the preceding paragraph, in which the seal mounting member carries one or more rearwardly projecting tongues, lugs or like elements for non-rotative, keying or locking engagement with a coacting part to be sealed, and in which the gasketing ring is provided with apertures corresponding thereto in number and arrangement to accommodate these elements, enabling the latter to project rearwardly of the ring.

The foregoing statements are indicative in a general way of the nature of the invention. Other and more specific objects will be apparent to those skilled in the art upon a full understanding of the construction and operation of the device.

A single embodiment of the invention is presented herein for purpose of illustration. It will be appreciated that the invention may be incorporated in other modified forms coming equally within the scope of the appended claims.

In the drawings:

Fig. 1 is a view in side elevation, showing a typical end face seal with which the improved gasketing ring may be associated;

Fig. 2 is a view in side elevation of the gasketing ring;

Fig. 3 is an end view of the ring, viewed from the right of Fig. 2, indicating in dotted lines the operative position of certain locking tongues of a seal mounting member with which the gasket ring is associated, as in Fig. 1; and Fig. 4 is an enlarged fragmentary view in longitudinal or axial section through an end face seal embodying the invention, showing the latter in operative relation to a pair of relatively rotatable parts sealed thereby.

As shown in Fig. 1, the reference numeral 10 generally designates a conventional type of end face oil seal, comprising an annular nose piece 11, which may be of any appropriate metallic or non-metallic sealing material, this nose piece being received in a forward recess (see Fig. 4) in a rigid diaphragm clamping ring 12. Ring 12 and an annular rear mounting member or ring 13 fixedly clamp opposite axial edges of a tubular diaphragm or sleeve 14 of rubber, synthetic rubber, or other appropriate flexible sealing material. Mounting member 13 carries a plurality of locking lugs or tongues 15, which project axially to the rear thereof in predetermined circumferential spacing. Tongues 15 are adapted to engage rearwardly in correspondingly arranged recesses of a part to be sealed with which seal 10 is associated, such as the housing 16 of Fig. 4, thus holding the seal against rotation relative thereto. The forward ring 12 of the seal is also held by well known means against rotation with reference to ring 13.

It is customary to interpose a compressible annular gasket or washer between the seal mounting member or ring 13 and such a housing or equivalent part. This member is usually of flat, disk-like outline, and is ordinarily cemented to the rear surface of ring 13 as a preliminary step to hold the gasket in place thereon prior to and during installation of the seal 10 in its intended setting. This is a slow and costly operation, hence the present invention contemplates the use of an improved gasketing member or ring which holds itself in place in the desired relation to seal 10 in general and its annular mounting member 13 in particular. The gasketing ring or band is generally designated 17 and, per se, is illustrated in Figs. 2 and 3 of the drawings.

Referring to Fig. 4 in conjunction with Figs. 2 and 3, gasketing ring 17 comprises a rear, radially inwardly extending gasket annulus or wall 18; this is provided adjacent the inner periphery thereof with a small annular, rearwardly projecting sealing rib 19 which is compressed against housing 16 when seal 10 is installed therein, to afford a high unit sealing pressure. Rear gasket wall 18 also has a plurality of circumferentially spaced apertures 20 formed therein, radially outwardly of rib 19. These apertures are somewhat larger in size than the locking tongues or lugs 15 on mounting ring 13, being correspondingly spaced and adapted to receive the tongues when gasketing member 17 is assembled to the mounting ring.

An axially extending annular band or sleeve portion 21 is integrally formed on the outer radial extremity of wall 18, projecting forwardly with reference thereto; and sleeve portion 21 has a radially inwardly directed annular retaining lip or bead 22 integrally formed on its opposite end margin.

The diameter of the sleeve portion member 17 is such that it has a relatively loose wrap-around or telescoped fit over the mounting ring 13, hence is easily and quickly applied, and the tongues 15 of the latter are freely received in the rear apertures 20 of the gasket member. Lip 22 engages forwardly of a shoulder on ring 13 to retain the member in operative position on the same prior to and during the mounting of seal 10 to the relatively rotatable parts of an installation.

A typical arrangement is illustrated in Fig. 4. The housing 16 has a counterbore 23 whose rear wall has circumferentially spaced recesses 24 which receive the tongues or lugs 15, the latter projecting substantially rearwardly of gasketing member 17. Rings 12, 13 are urged oppositely relatively to shaft 25 journalled in housing 16, under the force of an internal coil compression spring 26, as is typical in seals of this type; and, indeed, it will be appreciated that a gasketing member embodying the features of the invention may be used in conjunction with any one of many designs of seal unit, varying in specific details from the seal 10, which is chosen only for illustration.

The nose piece 11 of seal 10 may have relatively rotatable sliding and sealing engagement with any appropriate radial sealing surface fixedly associated with shaft 25, and such sealing provision is conventionally indicated in the form of an annular ring 27 secured to the shaft.

The gasketing member 17 is simple and inexpensive to manufacture by the ordinary molding procedure. It is easily applied to the seal by an operation consuming only a fraction of the time previously required in cementing a flat gasket or washer to the appropriate member of the seal. The provision of an inturned forward lip or bead 22 on gasket 17 which is of restricted radial width, and the relatively loosely fitting relationship of sleeve portion 21 to the seal member 13 enable the gasket to be shipped or sleeved over that member without appreciable distention of the gasket.

I claim:

1. In an end face seal, an annular one-piece mounting member having a main body portion of generally rectangular cross section, locking elements projecting outwardly from a first radial face of said body portion, and an annular one-piece gasket of flexible material on said body portion in displacement-resisting relation thereto, said gasket comprising a sleeve portion in intimate contact with the top face of said body portion, a radially inwardly extending wall integral with said sleeve portion along its outer margin, which wall is in intimate contact with said first radial face of said body portion, said wall having apertures for receiving said locking elements therethrough, and a radially inwardly extending bead integral with said sleeve portion along its outer margin and overlapping an outer edge of a second radial face of said body portion to retain said gasket on said body portion solely by the overlapping of said bead.

2. In an end face seal, an annular one-piece mounting member having a main body portion of generally rectangular cross section, locking elements projecting outwardly from a first radial face of said body portion, and an annular gasket of flexible material on said body portion in displacement-resisting relation thereto, said gasket comprising a sleeve portion in intimate contact with the top face of said body portion, a radially inwardly extending wall integral with said sleeve portion along its outer margin, which wall is in intimate contact with said first radial face of said body portion, said wall having apertures for receiving said locking elements therethrough, said wall further having an integral annular sealing rib projecting outwardly therefrom, said apertures being located radially outwardly of said sealing rib, and a radially inwardly extending bead integral with said sleeve portion along its outer margin and overlapping an outer edge of a second radial face of said body portion to retain said gasket on said body portion solely by the overlapping of said bead.

3. In an end face seal of the type characterized by an axially movable sealing ring having an end face for rotary sealing engagement with a relatively rotatable member, a mounting ring in axially spaced relation to the sealing ring, which mounting ring has a rim which is bounded by spaced end surfaces, and which mounting ring is provided intermediate the outer and inner margins of a first one of said spaced end surfaces which is farthest removed from the sealing ring with a plurality of circumferentially spaced locking projections, and an axially expansible and contractible tubular diaphragm connected at one of its ends with the sealing ring and at its other end with the second one of said spaced end surfaces of the mounting ring inwardly of the rim of that ring; the provision of a separate resiliently expansible band positioned about the rim of the mounting ring, which band is of generally U-shaped cross section and is provided at one of its ends with an inturned flange for engagement with the second end surface of the mounting ring to retain the band in position on the mounting ring, and which band is provided at its other end with an inturned flange of substantially greater radial extent than the first mentioned flange for engagement with the first end surface of the mounting ring, said last mentioned flange being provided with a plurality of circumferentially spaced apertures for the reception of the locking projections on the mounting ring and being further provided with a circumferentially continuous portion of increased thickness for endwise sealing engagement with a relatively stationary member having recesses within which the projections on the mounting ring are adapted to lock.

4. In an end face seal of the type characterized by an axially movable sealing ring having an end face for rotary sealing engagement with a relatively rotatable member, a mounting ring in axially spaced relation to the sealing ring, which mounting ring has a rim which is bounded by spaced end surfaces, and which mounting ring is provided intermediate the outer and inner margins of a first one of said spaced end surfaces which is farthest removed from the sealing ring with a plurality of circumferentially spaced locking projections, and an axially expansible and contractible tubular diaphragm connected at one of its ends with the sealing ring and at its other end with the second one of said spaced end surfaces of the mounting ring inwardly of the rim of that ring; the provision of a separate resiliently expansible band positioned about the rim of the mounting ring, which band is of generally U-shaped cross section and is provided at one of its ends with an inturned flange for engagement with the second end surface of the mounting ring to retain the band in position on the mounting ring, and which band is provided at its other end with an inturned flange of substantially greater radial extent than the first mentioned flange for engagement with the first end surface of the mounting ring, said last mentioned flange being provided with a plurality of circumferentially spaced apertures for the reception of the locking projections on the mounting ring and being further provided inwardly of said apertures with a circumferentially continuous rib-like formation of increased thickness for endwise sealing engagement with a relatively stationary member having recesses within which the projections on the mounting ring are adapted to lock.

5. Gasketing means for end-face seals of the axially expansible and collapsible type, in which the stationary element of the seal is a one-piece generally rectangular element adapted to be positioned against a relatively stationary machine part; said gasketing means being characterized by a thin substantially flat rubber annulus which is adapted to be removably positioned against the rear face of the stationary element of the seal in intimate contact therewith to seal the same with respect to said relatively stationary machine part, said sealing annulus being provided about its outer periphery with an integral band-like portion which is adapted to be removably sleeved without appreciable distention over the stationary element of the seal in intimate contact therewith, and said band-like portion being provided at the free end thereof with a small inturned bead which is adapted to engage with an outer edge of a radial face of the stationary element of the seal to retain the annulus in position against the rear face of the stationary element solely by the overlapping of the bead, said annulus being apertured radially inwardly of said bead for the reception of axially projecting locking means on said seal element.

References Cited in the file of this patent

UNITED STATES PATENTS

| | | |
|---|---|---|
| 2,243,255 | McDonald | May 27, 1941 |
| 2,294,105 | Wallgren | Aug. 25, 1942 |
| 2,426,174 | Bottomley | Aug. 26, 1947 |
| 2,489,781 | Isenbarger | Nov. 29, 1949 |
| 2,555,675 | Chambers et al. | June 5, 1951 |